(12) United States Patent
Cheng (10) Patent No.: US 7,927,681 B2
(45) Date of Patent: Apr. 19, 2011

(54) FASTENING ASSEMBLY AND CUSHION HAVING FASTENING ASSEMBLY

(75) Inventor: Sen-Mei Cheng, Chang Hua county (TW)

(73) Assignee: Taiwan Paiho Limited, Chang Hua County (TW)

( * ) Notice: Subject to any disclaimer, the term of this patent is extended or adjusted under 35 U.S.C. 154(b) by 356 days.

(21) Appl. No.: 12/348,346

(22) Filed: Jan. 5, 2009

(65) Prior Publication Data

US 2010/0139004 A1    Jun. 10, 2010

(30) Foreign Application Priority Data

Dec. 5, 2008   (TW) ................................. 97147260 A (51) Int. Cl.
*A44B 18/00*   (2006.01)
(52) U.S. Cl. .......................... 428/100; 428/119; 428/900
(58) Field of Classification Search .................. 428/100, 428/119, 900; 24/442
See application file for complete search history.

(56) References Cited

U.S. PATENT DOCUMENTS

| | | |
|---|---|---|
| 4,693,921 A | 9/1987 | Billarant et al. |
| 4,814,036 A | 3/1989 | Hatch |
| 4,881,997 A | 11/1989 | Hatch |
| 4,933,035 A | 6/1990 | Billarant et al. |
| 4,933,224 A | 6/1990 | Hatch |
| 5,061,540 A | 10/1991 | Cripps et al. |
| 5,110,649 A | 5/1992 | Morse et al. |
| 5,180,618 A | 1/1993 | Kessler et al. |
| 5,286,431 A | 2/1994 | Banfield et al. |
| 5,422,156 A | 6/1995 | Billarant |
| 5,500,268 A | 3/1996 | Billarant |
| 5,540,970 A | 7/1996 | Banfield et al. |
| 5,614,045 A | 3/1997 | Billarant |
| 5,654,070 A | 8/1997 | Billarant |
| 5,665,449 A | 9/1997 | Billarant |
| 5,725,928 A | 3/1998 | Kenney et al. |
| 5,736,217 A | 4/1998 | Banfield et al. |
| 5,795,640 A | 8/1998 | Billarant |
| 5,840,398 A | 11/1998 | Billarant |
| 5,900,303 A | 5/1999 | Billarant |
| 5,922,436 A | 7/1999 | Banfield et al. |
| 5,932,311 A | 8/1999 | Kenney et al. |
| 5,942,177 A | 8/1999 | Banfield |
| 5,945,193 A | 8/1999 | Pollard et al. |
| 6,044,525 A | 4/2000 | Sastre et al. |
| 6,068,122 A | 5/2000 | Burns et al. |
| 6,123,187 A | 9/2000 | Bartels |
| 6,129,970 A | 10/2000 | Kenney et al. |
| 6,148,487 A | 11/2000 | Billarant |
| 6,200,026 B1 | 3/2001 | Carmichael |
| 6,308,876 B1 | 10/2001 | Havens |
| 6,348,252 B1 | 2/2002 | Kenney et al. |
| 6,427,839 B1 | 8/2002 | Helfer-Grand |
| 6,481,063 B2 | 11/2002 | Shepard et al. |
| 6,596,371 B1 | 7/2003 | Billarant et al. |

(Continued)

*Primary Examiner* — Alexander Thomas
(74) *Attorney, Agent, or Firm* — Ming Chow; Sinorica, LLC (57) ABSTRACT

A fastening assembly and a cushion having the same are provided. The fastening assembly includes a first strip and a second strip. The first strip has a first surface protrudingly provided with a plurality of hooks, and a second surface to which the second strip is bonded. The fastening assembly further includes a first protective layer and a second protective layer, both comprising a magnetic substance. The first protective layer is disposed lengthwise along both lateral sides of the first surface of the first strip so as to form sidewalls respectively and embed some of the hooks. The second protective layer is attached to the first protective layer so as to cover the hooks on the first surface of the first strip.

20 Claims, 7 Drawing Sheets

U.S. PATENT DOCUMENTS

| | | |
|---|---|---|
| 6,604,630 B1 | 8/2003 | Cabatic et al. |
| 6,606,765 B2 | 8/2003 | Edmondson |
| 6,656,563 B1 | 12/2003 | Leach et al. |
| 6,684,464 B1 | 2/2004 | Mody et al. |
| 6,737,974 B2 | 5/2004 | Dickinson |
| 6,890,138 B1 | 5/2005 | Myrick |
| 6,913,810 B2 | 7/2005 | Wang et al. |
| 6,976,437 B2 | 12/2005 | Fisch et al. |
| 7,021,825 B1 | 4/2006 | Schultz |
| 7,303,711 B2 | 12/2007 | Gallant et al. |
| 2001/0038161 A1 | 11/2001 | Kenney et al. |
| 2002/0058123 A1 | 5/2002 | Kenney et al. |
| 2004/0103503 A1 | 6/2004 | Leach et al. |
| 2004/0108620 A1 | 6/2004 | Leach et al. |
| 2005/0196599 A1 | 9/2005 | Line et al. |
| 2008/0092348 A1 | 4/2008 | Line et al. |

FASTENING ASSEMBLY AND CUSHION HAVING FASTENING ASSEMBLY

BACKGROUND OF THE INVENTION

1. Technical Field

The present invention relates to a fastening assembly and, more particularly, to a fastening assembly co-molded with a foam article.

2. Description of Related Art

The conventional hook-and-loop fastener, or better known by the brand name Velcro, was invented by George de Mestral, a Swiss engineer, under the inspiration of burrs. The hook-and-loop fastener comprises a hook side where tiny hooks are disposed thereon and a loop side covered with even smaller and finer loop-like fastening structures. When the hook side and the loop side are pressed together, the hooks on the hook side engage with the loop-like fastening structures on the loop side so that the two sides are fastened together.

In recent years, the hook-and-loop fastener, which is easily assembled and detached, is often coupled and used with other articles. When a hook-and-loop fastener is applied to a foam article such as a seat cushion, a buffer pad, and so on, the hook-and-loop fastener is bonded to the foam article with the hook side facing outward so as to fasten with another article having a corresponding loop side. Typically, a seat cushion with a hook-and-loop fastener is manufactured by placing the hook-and-loop fastener at a predetermined location in a mold and introducing a foam material into the mold. The foam material is then co-molded with the hook-and-loop fastener and, when completely set, takes on the shape defined by the mold. However, during the foaming process, the foam material tends to cover the hooks of the hook-and-loop fastener so that, after the foam material is set, the hooks of the hook-and-loop fastener cannot fasten with corresponding fastening structures. Thus, a defective product is produced, and the production cost is wasted. To prevent the foam material from damaging the hooks and consequently the hook-and-loop fastener, a traditional approach is to cover the hooks temporarily with an extra protective film, which is removed after the foam material is co-molded with the hook-and-loop fastener.

In addition, while the foam material expands, the expanding foam material produces a pushing force in all directions. If the hook-and-loop fastener is not securely positioned at the predetermined location in the mold, the pushing force generated during the foaming process will push the hook-and-loop fastener away from the predetermined location so that the molded product is defective, with the hook-and-loop fastener displaced.

In order to overcome the aforesaid drawback, it has been proposed, as in U.S. Pat. No. 4,693,921, to place a temporary protective film comprising an iron sheet over the hook-and-loop fastener so as to protect the hooks on a fastening side thereof from being covered by the foam material during the foaming process and allow the hook-and-loop fastener to be attracted and thus secured in position to a magnet on the mold. However, this temporary protective film has to be removed after the molding process by heating or by use of chemicals, which involves a complicated removing procedure and is very inconvenient.

BRIEF SUMMARY OF THE INVENTION

In order to solve the aforementioned shortcomings of the prior arts, the present invention provides a fastening assembly comprising a first strip and a second strip, and the first strip has a first surface protrudingly provided with a plurality of hooks, and a second surface. The fastening assembly further comprises a first protective layer and a second protective layer. The first and the second protective layer both comprise a magnetic substance. The first protective layer is provided lengthwise along two lateral sides of the first surface of the first strip and embeds some of the hooks, and the second protective layer is attached to the first protective layer so as to cover the hooks on the first surface of the first strip. In addition, the second strip is attached to the second surface of the first strip.

Therefore, a primary object of the present invention is to provide a fastening assembly which is suitable for use in a foaming process and is furnished with a protective layer for covering hooks of the fastening assembly and thus preventing the hooks from being damaged by the foam material.

Another object of the present invention is to provide a fastening assembly which is suitable for use in a foaming process and is furnished with a protective layer for resisting a pressure generated by expansion of a foam material and thereby protecting the hooks from deformation or damage due to compression by the expanding foam material.

Yet another object of the present invention is to provide a fastening assembly which is suitable for use in a foaming process and comprises a magnetic substance so that the fastening assembly can be readily secured in a predetermined position to a mold by magnetic attraction and easily removed from the mold after the foaming process.

Additionally, the present invention also provides a cushion having a fastening assembly, and the cushion comprises a foam cushion body and at least one fastening assembly. The foam cushion body is co-molded with the fastening assembly into one piece. The fastening assembly essentially comprises a first strip having a first surface and a second surface, and a second strip attached to the second surface of the first strip. The first surface of the first strip is protrudingly provided with a plurality of hooks. The fastening assembly further comprises a first protective layer and a second protective layer, both comprising a magnetic substance. The first protective layer is provided lengthwise along two lateral sides of the first surface of the first strip and embeds some of the hooks, and the second protective layer is attached to the first protective layer so as to cover the hooks on the first surface of the first strip. In addition, the foam cushion body is engaged with the second strip of the fastening assembly.

Therefore, another object of the present invention is to provide a cushion having a fastening assembly, wherein the fastening assembly comprises a protective layer for preventing hooks of the fastening assembly and subsequently from being damaged by a foam material during a foaming process of the cushion.

Still another object of the present invention is to provide a cushion having a fastening assembly, wherein the fastening assembly comprises a protective layer for resisting a pressure generated by expansion of a foam material during a foaming process of the cushion and thus protecting the hooks against deformation or damage due to compression by the expanding foam material.

A further object of the present invention is to provide a cushion having a fastening assembly, wherein the fastening assembly comprises a magnetic substance so that the fastening assembly can be readily secured in position to a mold by magnetic attraction during a foaming process of the cushion and easily removed from the mold after the foaming process.

BRIEF DESCRIPTION OF THE SEVERAL VIEWS OF THE DRAWINGS

The invention as well as a preferred mode of use, further objects and advantages thereof will be best understood by referring to the following detailed description of illustrative embodiments in conjunction with the accompanying drawings, wherein.

DETAILED DESCRIPTION OF THE INVENTION

Disclosed herein are a fastening assembly and a cushion having the same. Since the physical principles involved in the present invention and the basic connection relationships among related elements are well known to persons of ordinary skill in the art, a detailed description of such principles and relations is omitted herein. Besides, the drawings referred to in the following description are not and need not be drawn according to actual dimensions for they are intended to demonstrate features of the present invention only schematically.

Figure 1A:
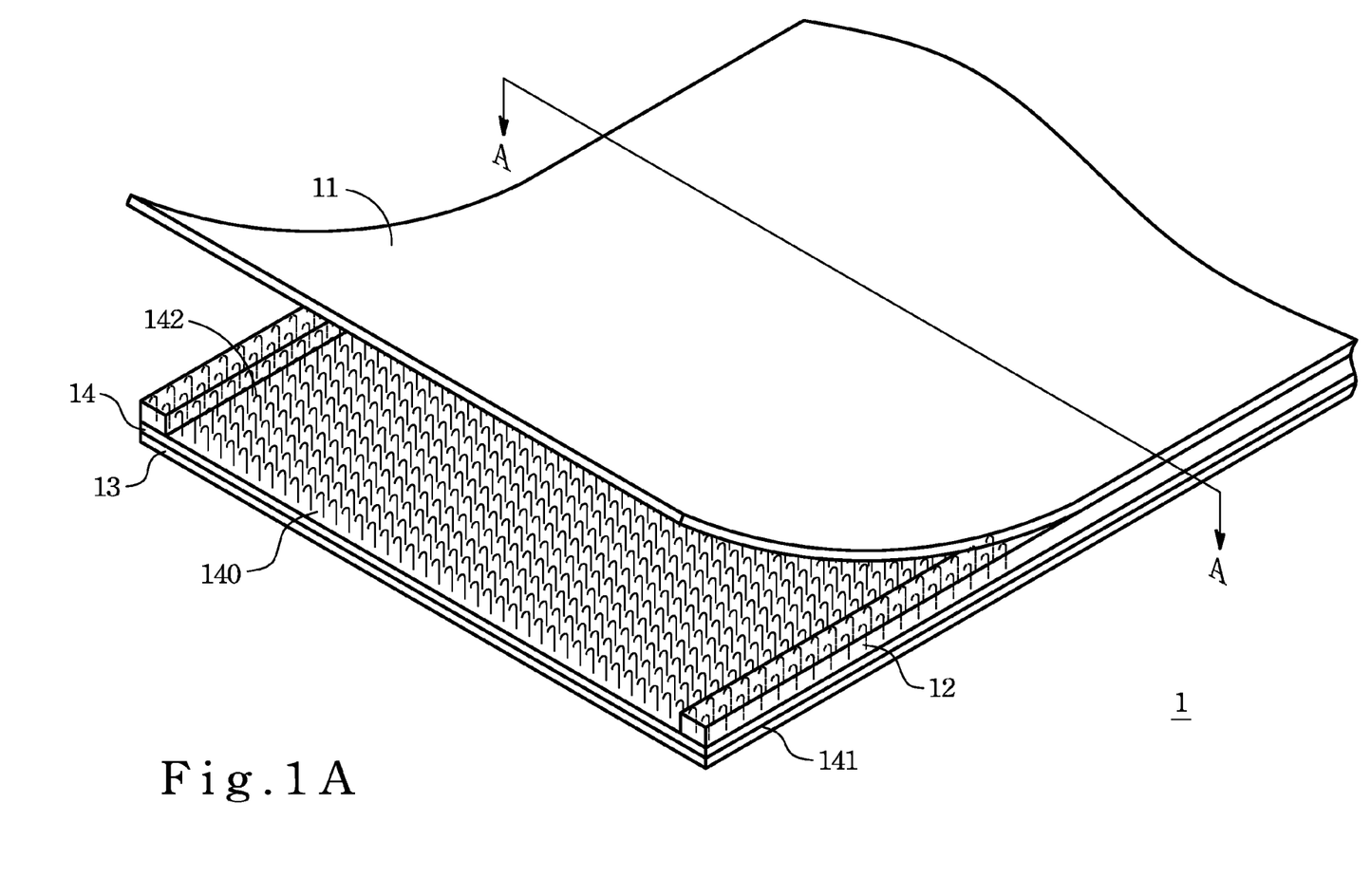
FIG. 1A is a perspective view of a fastening assembly according to a first preferred embodiment of the present invention.
Figure 1B:
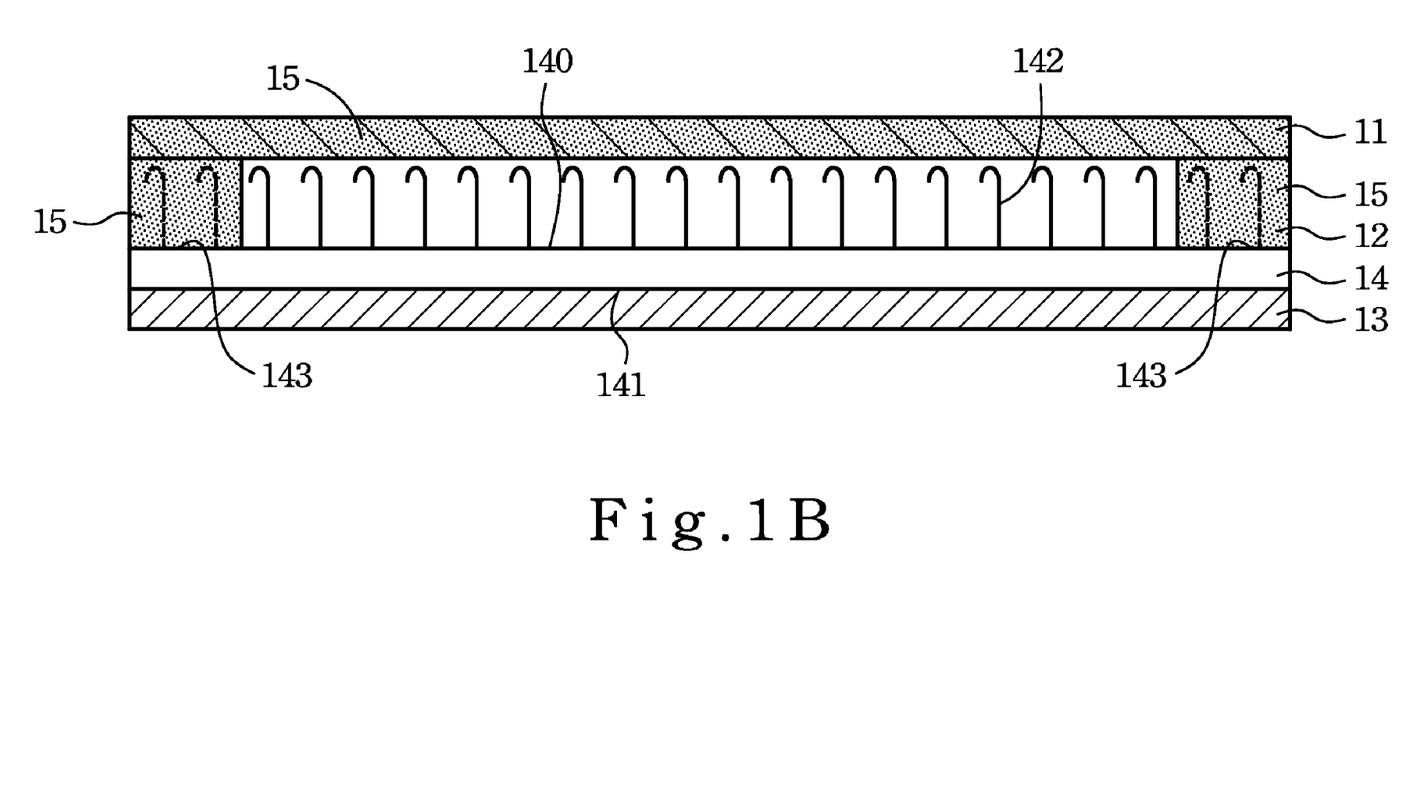
FIG. 1B is a sectional view of the fastening assembly according to the first preferred embodiment of the present invention, taken along a line AA in FIG. 1.

Please refer to FIG. 1A and FIG. 1B. FIG. 1A is a perspective view of a fastening assembly 1 according to a first preferred embodiment of the present invention and FIG. 1B is a sectional view of the fastening assembly 1 taken along a line AA in FIG. 1A. The fastening assembly 1 comprises a first strip 14, a second strip 13, a first protective layer 12, and a second protective layer 11. The first strip 14 has a first surface 140 protrudingly provided with a plurality of hooks 142, and a second surface 141 to which the second strip 13 is attached. The second strip 13 engages with a foam material molded and formed in a subsequent foaming process. The second strip 13 supports and enhances the integral strength of the fastening assembly 1 so as to prevent the strips from folding or deformation which might otherwise occur during the manufacturing process. The second strip 13 is preferably made of a non-woven material, a fibrous material, or any other materials having a surface formed with microstructures for engaging with the foam material.

The first protective layer 12 comprises a magnetic substance 15 and is provided lengthwise along two lateral sides 143 of the first surface 140 of the first strip 14 so as to form sidewalls respectively. Furthermore, the first protective layer 12 embeds some of the hooks 142, whereby the first protective layer 12 bonds to the first strip 14 more securely. The magnetic substance 15 in the first protective layer 12 provides magnetic attraction to a magnet installed in a mold for the foaming process.

The second protective layer 11 is attached to the first protective layer 12 so as to cover the hooks 142 on the first surface 140 of the first strip 14. More particularly, the second protective layer 11 is attached to an upper portion of the first protective layer 12 by gluing, hot pressing, or other physical or chemical means. Thus, the first protective layer 12 and the second protective layer 11 jointly and completely enclose the first surface 140 and the hooks 142 protruding therefrom. Like the first protective layer 12, the second protective layer 11 further comprises the magnetic substance 15. The magnetic substance 15 is preferably a ferromagnetic power, such as an iron powder or powder of a ferrous alloy, provided the magnetic substance 15 is attractable to magnets. In addition, the first protective layer 12 is preferably made of polyurethane (PU) by, for example, printing a polyurethane material on the first strip 14. The second protective layer 11, on the other hand, is made of any flexible material, such as paper.

Figure 1C:
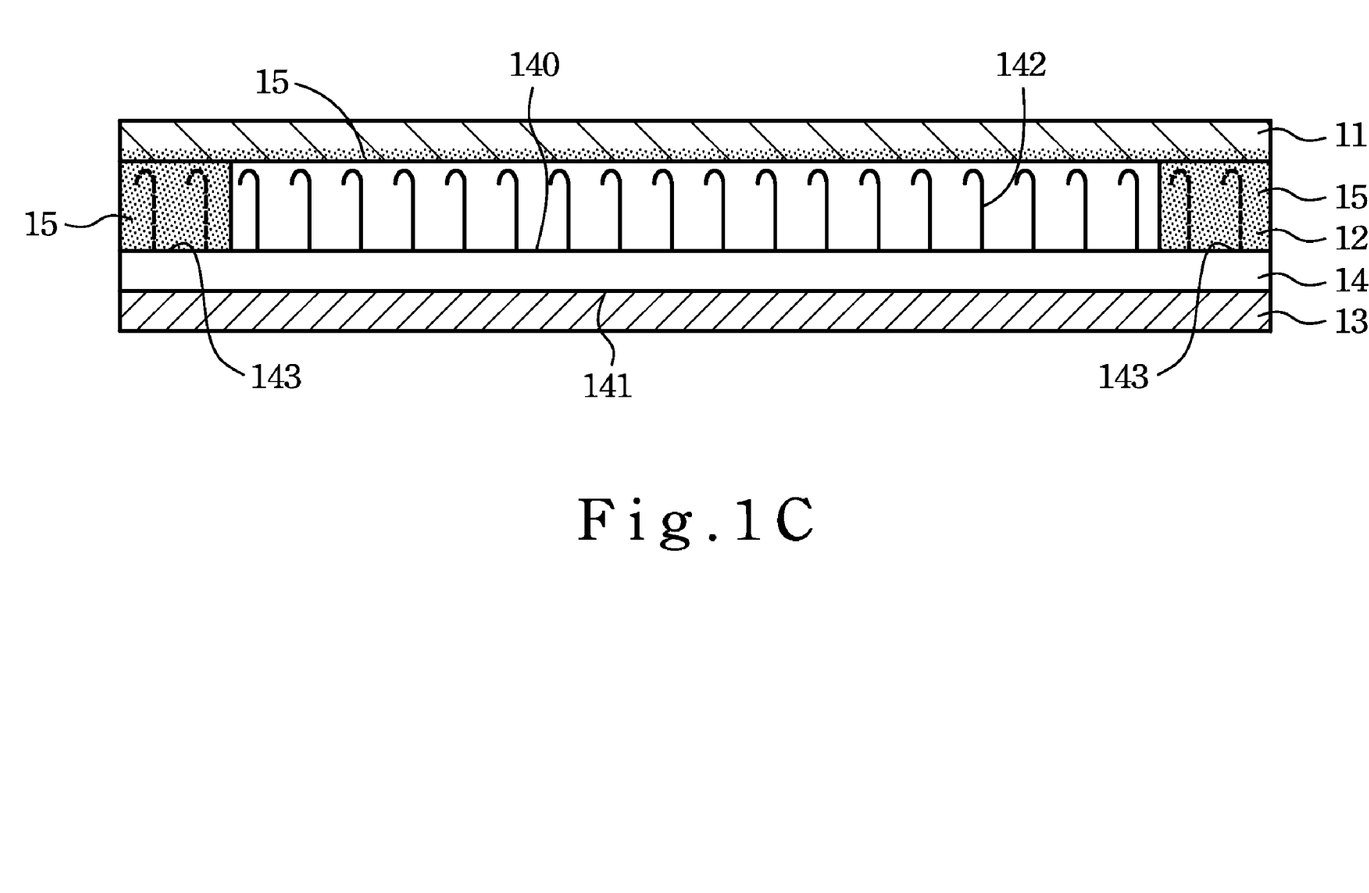
FIG. 1C is a sectional view of a fastening assembly according to another aspect of the first preferred embodiment of the present invention.

Please refer again to FIG. 1B. During the manufacture process of the fastening assembly 1, the magnetic substance 15 is mixed into the second protective layer 11 so as to be substantially evenly distributed in the second protective layer 11. Alternatively, as shown in FIG. 1C, the magnetic substance 15 is coated substantially evenly on a surface of the second protective layer 11 that faces the first strip 14.

Figure 1D:
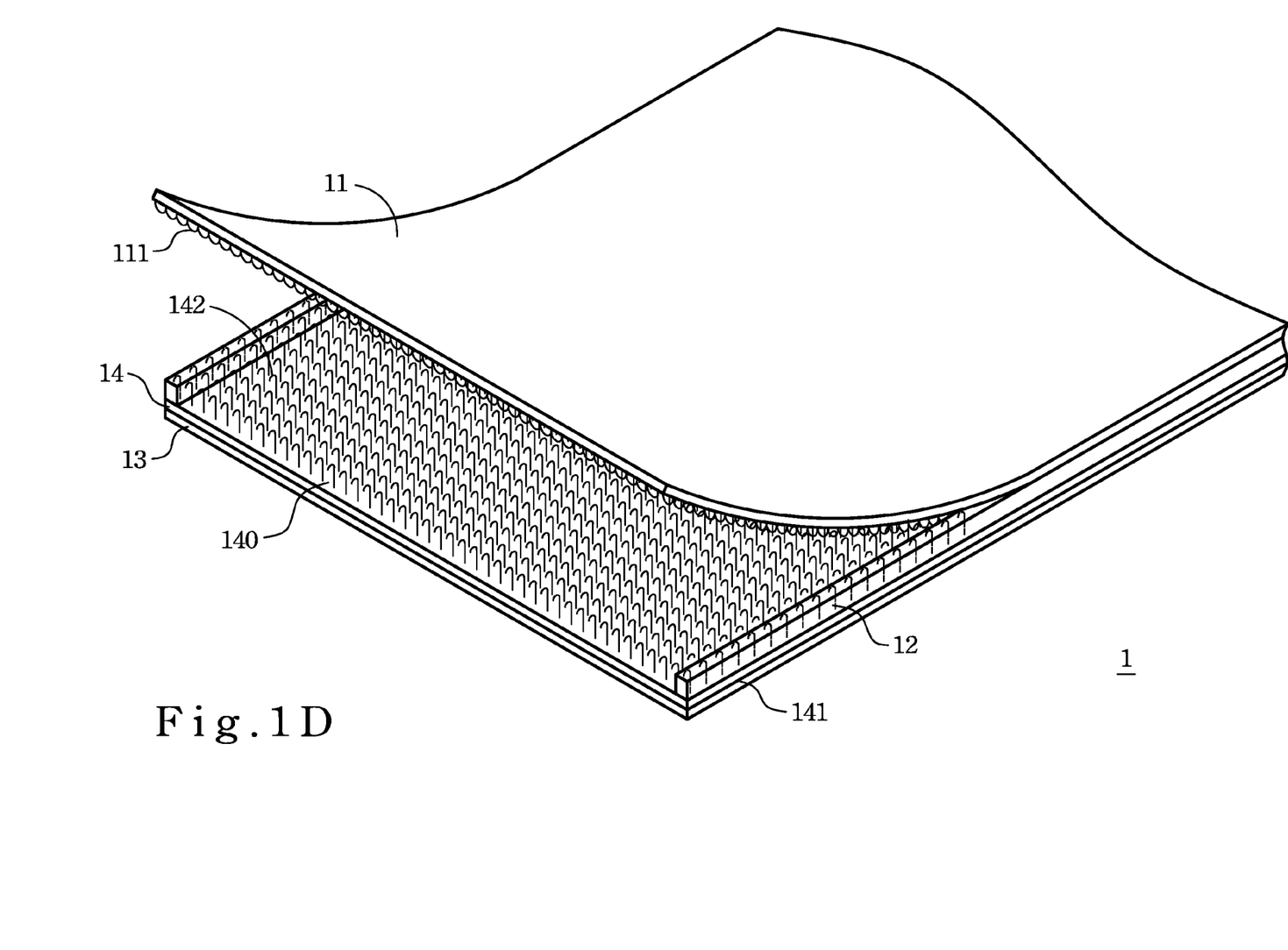
FIG. 1D is a perspective view of a fastening assembly according to yet another aspect of the first preferred embodiment of the present invention.

Referring to FIG. 1D for a perspective view of another aspect of the fastening assembly according to the first preferred embodiment of the present invention, the surface of the second protective layer 11 that faces the first strip 14 is further provided with a plurality of fastening structures 111 for engaging with the hooks 142. Thus, the second protective layer 11 covers the first surface 140 of the first strip 14 and works in conjunction with the first protective layer 12 to completely enclose the first surface 140 and the hooks 142 protruding therefrom.

Figure 1E:
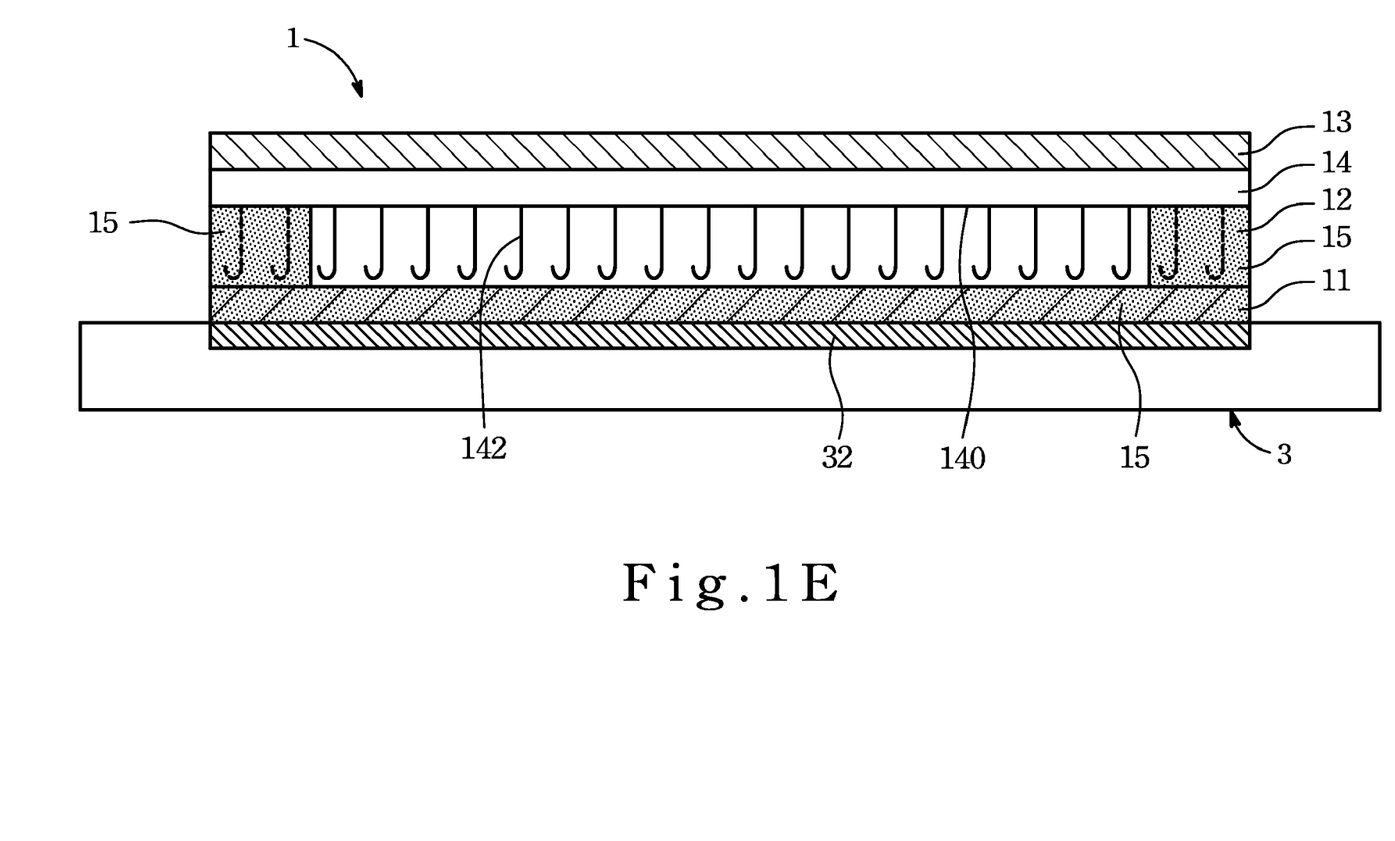
FIG. 1E is a sectional view of the fastening assembly according to the first preferred embodiment of the present invention when disposed in a foaming mold.

Refer to FIG. 1E for a sectional view of the fastening assembly 1 according to the first preferred embodiment of the present invention when placed in a foaming mold 3. During the manufacturing process of an article molded out of a foam material, the first protective layer 12 and the second protective layer 11 are magnetically attracted, by virtue of the magnetic substance 15, to a magnet 32 in the mold 3 so that the entire fastening assembly 1 is secured in position to the mold 3. After the article is formed, the foam material is engaged with the second strip 13, and the fastening assembly 1 can be easily removed from the mold 3 together with the formed foam article. Moreover, since the second protective layer 11 and the first protective layer 12 which forms the sidewalls along the two lateral sides 143 of the first surface 140 of the first strip 14 jointly and completely enclose the first surface 140 and the hooks 142, which, in part, distinguishes the fastening assembly 1 from the conventional hook-and-loop fastener. Thus the hooks 142 and consequently the fastening assembly 1 are not damaged during the foaming process by an overly expanding portion of the foam material that might have covered the hooks 142. Besides, during the foaming process, the foam material generates a pushing force in all direction while expanding. If the pushing force becomes excessive due to improper control of the foaming process, the hooks of the conventional hook-and-loop fastener will be compressed and deformed. However, in the fastening assembly 1 according to the present invention, the sidewalls formed by the second protective layer 11 help the fastening assembly 1 oppose to the pushing force generated by the expanding foam material. Meanwhile, as the first protective layer 12 and the second protective layer 11 together form a closed space and enclose the hooks 142 in it, the hooks 142 are unlikely to be deformed or even damaged by compression of the pushing force.

Figure 1F:
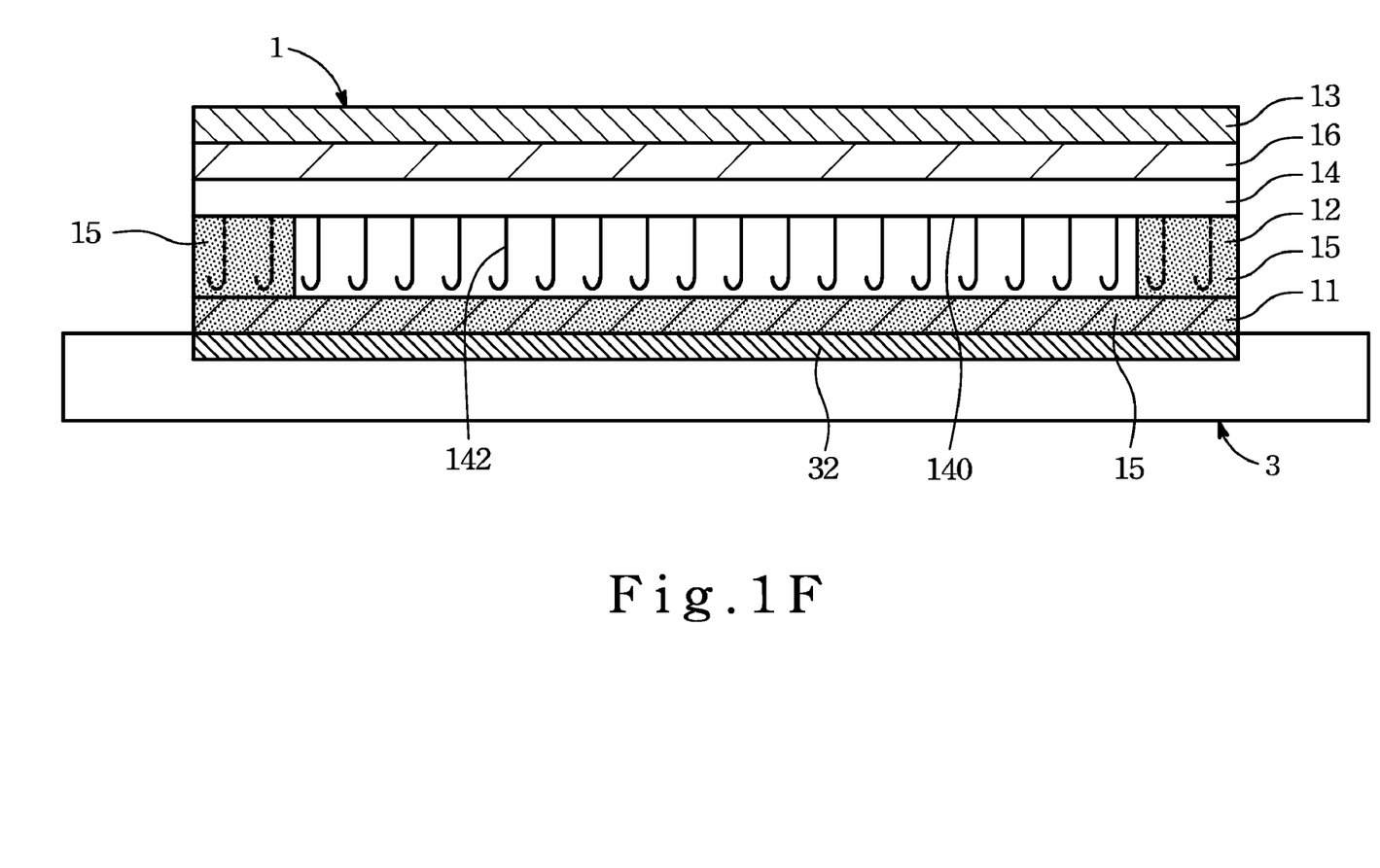
FIG. 1F is a sectional view of a fastening assembly according to still another aspect of the first preferred embodiment of the present invention when disposed in a foaming mold.

Refer to FIG. 1F for a sectional view of yet another aspect of the fastening assembly according to the first preferred embodiment of the present invention. In order to provide a stronger magnetically securing effect, the fastening assembly 1 is further provided with a magnetic layer 16 between the first strip 14 and the second strip 13. The magnetic layer 16 comprises the magnetic substance 15 so that, when the fastening assembly 1 is placed in the mold 3, the magnet 32 magnetically attracts not only the first protective layer 12 and the second protective layer 11, but also the magnetic substance layer 16. As a result, the fastening assembly 1 is positioned more securely in the mold 3 and less likely to be pushed away from its predetermined position by the pushing force generated by the expanding foam material.

In addition to the fastening assembly in the first preferred embodiment, the present invention also provides a cushion having a fastening assembly as a second preferred embodiment, as described below.

Figure 2A:
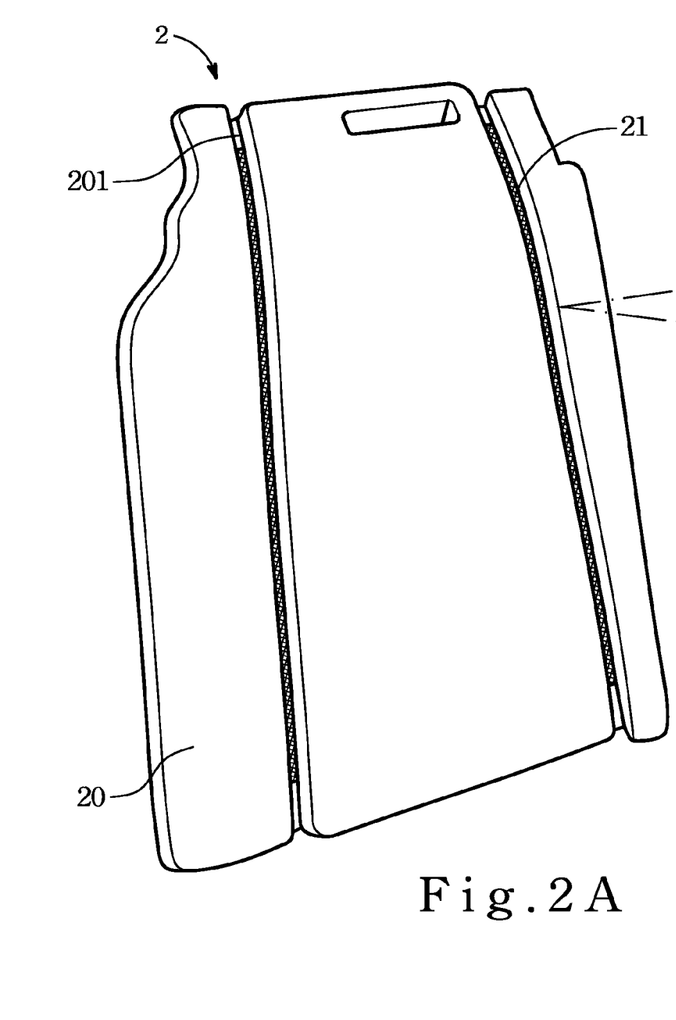
FIG. 2A is a perspective view of a cushion having a fastening assembly according to a second preferred embodiment of the present invention.
Figure 2B:
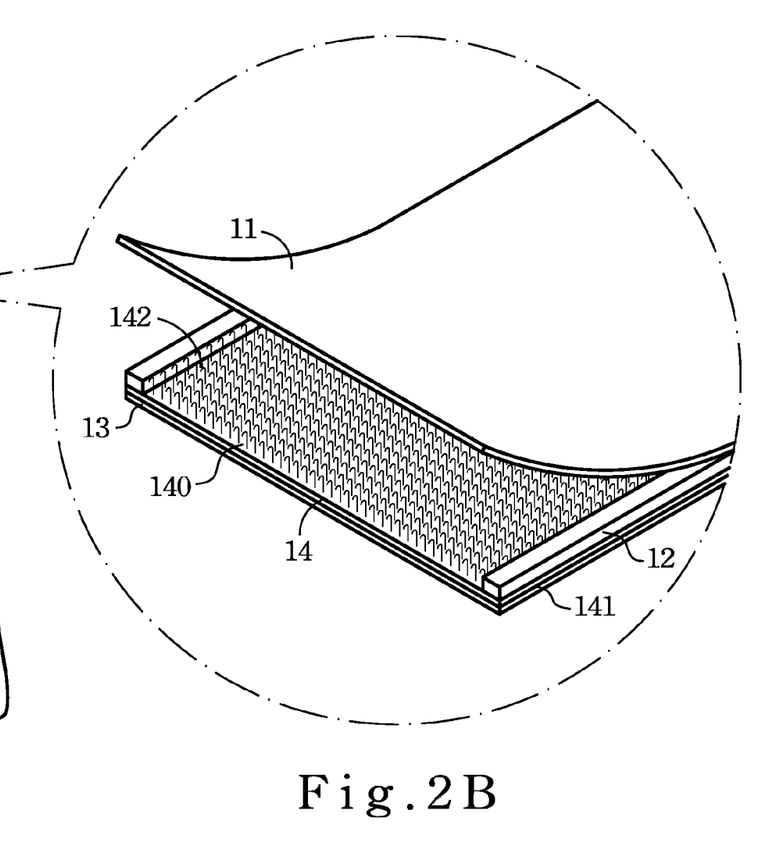
FIG. 2B is a partial enlarged view of the fastening assembly in FIG. 2A according to the second preferred embodiment of the present invention.

Referring to FIG. 2A, which shows a perspective view of a cushion 2 having a fastening assembly 1 according to the second preferred embodiment of the present invention, the cushion 2 comprises a foam cushion body 20 in addition to at least one fastening assembly 1. The foam cushion body 20 and the fastening assembly 1 are co-molded into one piece. Referring to FIG. 2B, which shows a partial enlarged view of the fastening assembly 1 in FIG. 2A, the fastening assembly 1 is identical to its counterpart in the first preferred embodiment in comprising the first strip 14, the first surface 140, the second surface 141, the hooks 142, the second strip 13, the first protective layer 12, and the second protective layer 11. The components cited above have substantially the same features and connection relationships as their equivalents in the first preferred embodiment and therefore are not described herein repeatedly. In addition, the foam cushion body 20 engages with the second strip 13 of the fastening assembly 1. Thus, with the fastening assembly 1, the cushion 2 is fastened to an article (such as a leather bolster of a seat cushion or the backrest of a chair) having corresponding fastening structures.

Besides, the foam cushion body 20 further has at least one groove 201 for accommodating the fastening assembly 1 therein to facilitate assembly of the cushion 2 with other articles having corresponding fastening structures.

The present invention is herein described by reference to preferred embodiments thereof and it is understood that the embodiments are not intended to limit the scope of the present invention. Moreover, as the contents disclosed herein should be readily understood and can be implemented by a person skilled in the art, all equivalent changes or modifications which do not depart from the spirit of the present invention should be encompassed by the appended claims.

The invention claimed is:

1. A fastening assembly, comprising a first strip having a first surface and a second surface, the first surface being protrudingly provided with a plurality of hooks, the fastening assembly being characterized by further comprising:
   a first protective layer comprising a magnetic substance and provided lengthwise along two lateral sides of the first surface of the first strip so as to form sidewalls respectively and embed some of the hooks;
   a second protective layer comprising the magnetic substance, wherein the second protective layer is attached to the first protective layer so as to cover the hooks of the first surface; and
   a second strip attached to the second surface of the first strip.

2. The fastening assembly of claim 1, wherein the second protective layer has a surface facing the first strip and provided with a plurality of fastening structures for engaging with the hooks.

3. The fastening assembly of claim 1, wherein the second strip is made of a non-woven material or a fibrous material.

4. The fastening assembly of claim 1, wherein the magnetic substance is substantially evenly distributed in the second protective layer.

5. The fastening assembly of claim 1, wherein the magnetic substance is substantially evenly distributed on a surface of the second protective layer that faces the first strip.

6. The fastening assembly of claim 1, wherein the magnetic substance is a ferromagnetic powder.

7. The fastening assembly of claim 1, wherein the first protective layer is made of polyurethane.

8. The fastening assembly of claim 1, wherein the first protective layer is formed by printing polyurethane on the first strip.

9. The fastening assembly of claim 1, wherein the second protective layer is made of paper.

10. The fastening assembly of claim 1, further comprising a magnetic layer interposed between the first strip and the second strip and comprising the magnetic substance.

11. A cushion having a fastening assembly, comprising a foam cushion body and at least a fastening assembly, the foam cushion body being co-molded with the fastening assembly into one piece, the cushion being characterized in that the fastening assembly comprises:
    a first strip having a first surface and a second surface, the first surface being protrudingly provided with a plurality of hooks;
    a first protective layer comprising a magnetic substance and provided lengthwise along two lateral sides of the first surface of the first strip so as to form sidewalls respectively and embed some of the hooks;
    a second protective layer comprising the magnetic substance, wherein the second protective layer is attached to the first protective layer so as to cover the hooks of the first surface; and
    a second strip attached to the second surface of the first strip, wherein the foam cushion body is engaged with the second strip of the fastening assembly.

12. The cushion having the fastening assembly of claim 11, wherein the foam cushion body further has at least a groove for accommodating the fastening assembly.

13. The cushion having the fastening assembly of claim 11, wherein the second protective layer has a surface facing the first strip and provided with a plurality of fastening structures for engaging with the hooks.

14. The cushion having the fastening assembly of claim 11, wherein the second strip is made of a non-woven material or a fibrous material.

15. The cushion having the fastening assembly of claim 11, wherein the magnetic substance is substantially evenly distributed in the second protective layer.

16. The cushion having the fastening assembly of claim 11, wherein the magnetic substance is substantially evenly distributed on a surface of the second protective layer that faces the first strip.

17. The cushion having the fastening assembly of claim 11, wherein the magnetic substance is a ferromagnetic powder.

18. The cushion having the fastening assembly of claim 11, wherein the first protective layer is made of polyurethane.

19. The cushion having the fastening assembly of claim 11, wherein the first protective layer is formed by printing polyurethane on the first strip.

20. The cushion having the fastening assembly of claim 11, further comprising a magnetic substance layer interposed between the first strip and the second strip and comprising the magnetic substance.

* * * * *